(12) United States Patent
Tankhilevich et al.

(10) Patent No.: US 6,198,989 B1
(45) Date of Patent: Mar. 6, 2001

(54) MONITOR AND REMOTE CONTROL VIA LONG BASELINE RTK

(75) Inventors: Boris G. Tankhilevich, Walnut Creek; Michael Timo Allison, Santa Clara, both of CA (US)

(73) Assignee: Trimble Navigation LTD, Sunnyvale, CA (US)

( * ) Notice: Subject to any disclaimer, the term of this patent is extended or adjusted under 35 U.S.C. 154(b) by 0 days.

(21) Appl. No.: 09/315,801

(22) Filed: May 21, 1999

(51) Int. Cl.[7] .............................. G06F 17/00; G06F 7/00
(52) U.S. Cl. .............................. 701/2; 701/213; 701/215; 342/357.06; 342/357.09; 342/357.12
(58) Field of Search ................................ 701/2, 213, 214, 701/215; 342/357.06, 357.09, 357.12, 357.13; 455/12.1, 13.1, 456, 524, 525

(56) References Cited

U.S. PATENT DOCUMENTS

| | | | |
|---|---|---|---|
| 4,578,678 | * | 3/1986 | Hurd . |
| 4,596,042 | * | 6/1986 | Stangl ................................. 455/524 |
| 4,872,015 | * | 10/1989 | Rosen . |
| 4,905,221 | * | 2/1990 | Ichiyoshi . |
| 5,323,322 | * | 6/1994 | Mueller et al. . |
| 5,890,070 | * | 3/1999 | Hamada .............................. 455/524 |

\* cited by examiner

*Primary Examiner*—William A. Cuchlinski, Jr.
*Assistant Examiner*—Gertrude Arthur
(74) *Attorney, Agent, or Firm*—Boris G. Tankhilevich

(57) ABSTRACT

A method and a system for remote control of a rover over a long base line is disclosed. The system includes a primary base station (PBS), a secondary base station (SBS), a rover, a primary long line data link between PBS and SBS, and a secondary two-way data link between the SBS and the rover. The primary data link and the secondary data link comprise a long baseline feedback loop that is used to transmit the control data to the rover, to adjust the control data, and to transmit back from the rover to the SBS and to the PBS the collected feedback data.

24 Claims, 3 Drawing Sheets

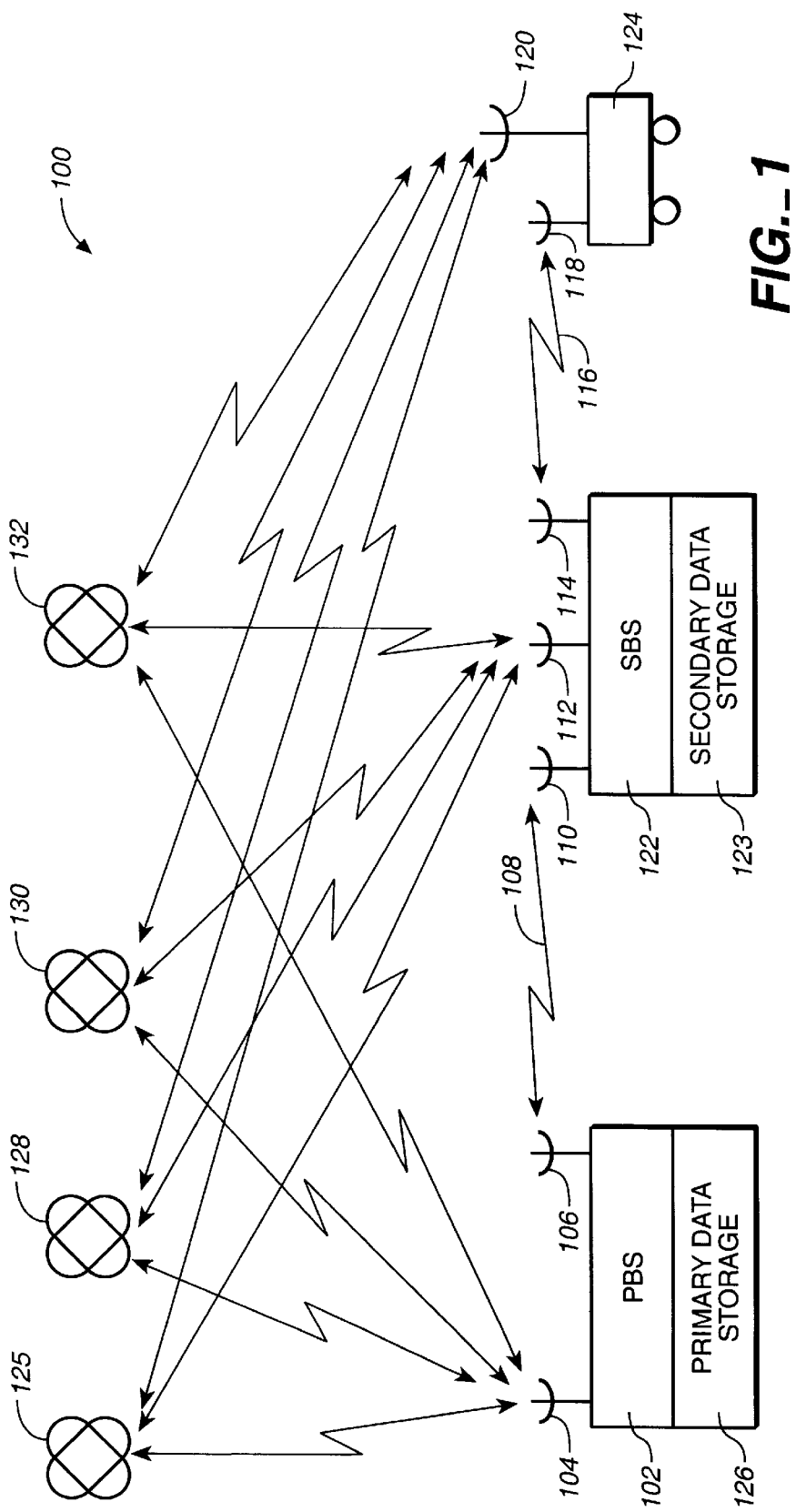
*FIG._1*

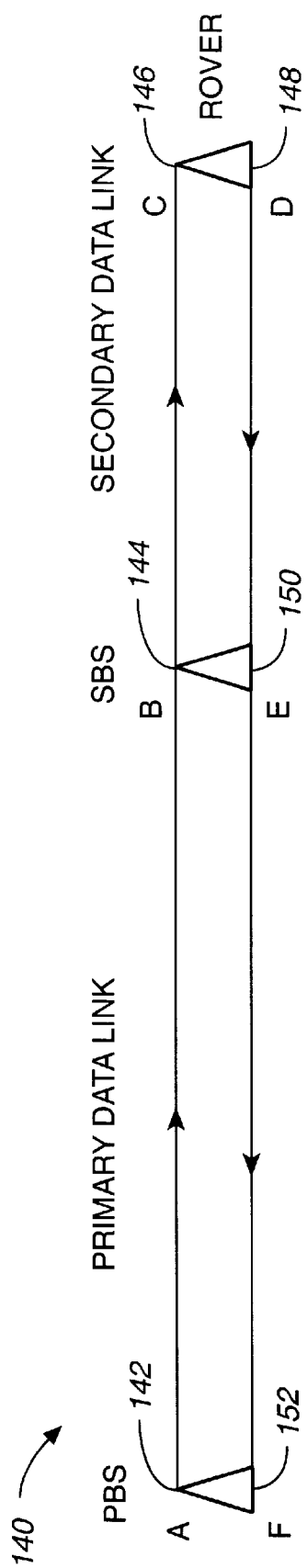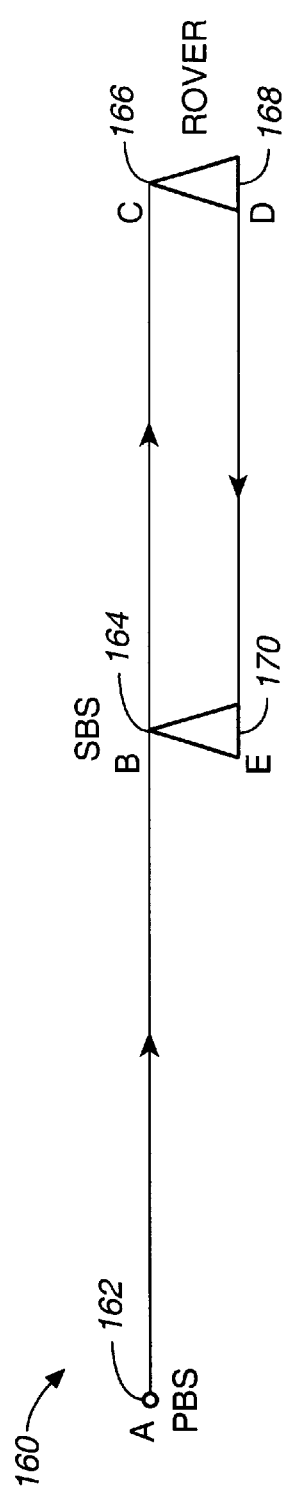

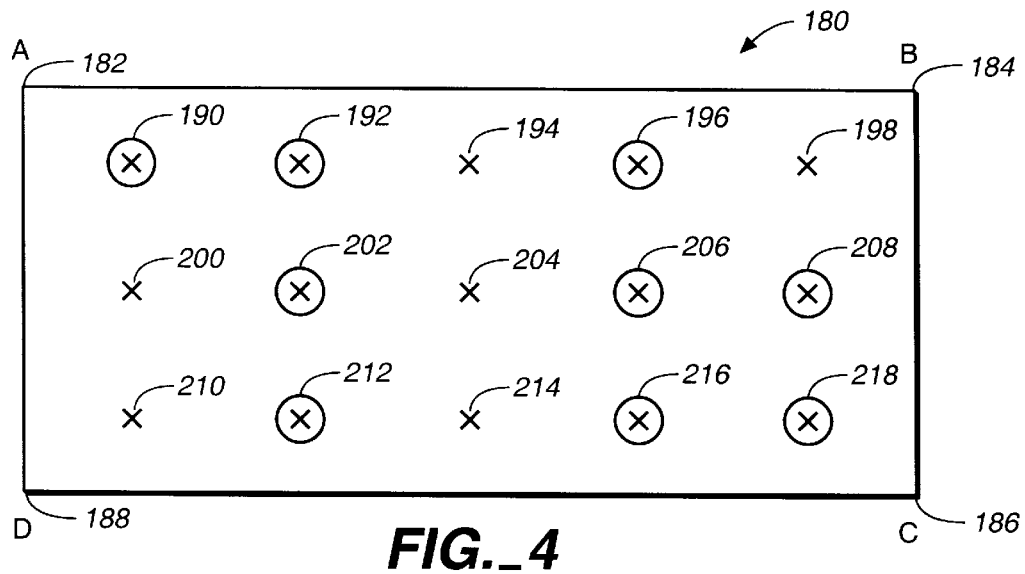
FIG._4
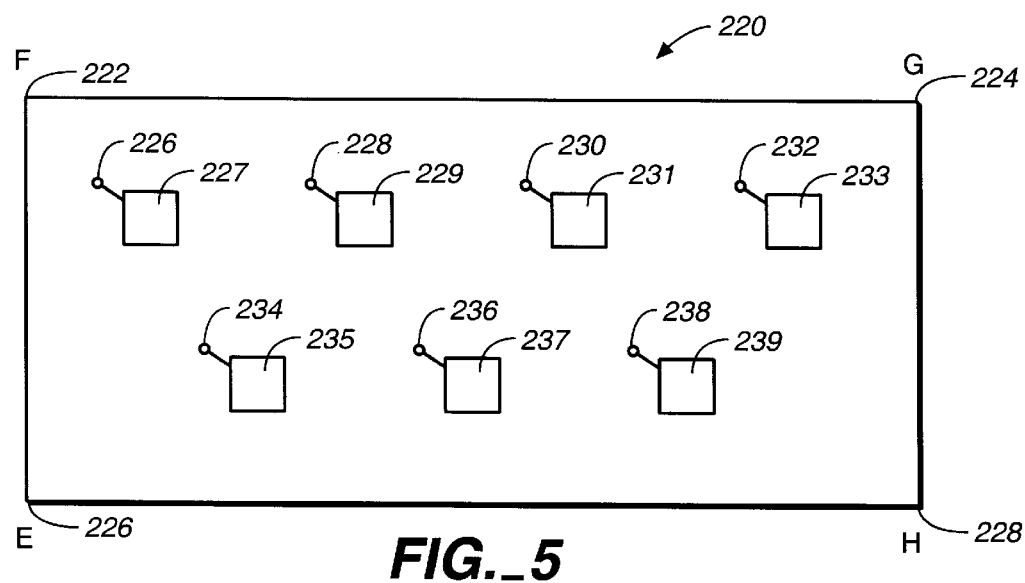
FIG._5

MONITOR AND REMOTE CONTROL VIA LONG BASELINE RTK

BACKGROUND

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 550 relative to the equator and being separated from each other by multiples of 600 longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, and can be used to determine an observer's position anywhere on the Earth's surface, 24 hours per day. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (nineteen centimeter carrier wavelength) and an L2 signal having a frequency f2=1227.6 MHz (twenty-four centimeter carrier wavelength). These two frequencies are integral multiplies f1=1,540 f0 and f2=1,200 f0 of a base frequency f0=1.023 MHz. (The other frequencies are being planned by the DOD). The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers operated by users.

A first known PRN code for each GPS satellite, sometimes referred to as a precision code or P-code, is a relatively long, fine-grained code having an associated clock or chip rate of f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats.

Accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all other satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where k $(=1,2,\ldots 24)$ is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

The following discussion is applicable to any satellite navigational system, but is focused on GPS applications to be substantially specific.

Differential Global Positioning System (DGPS) is a technique that significantly improves both the accuracy and the integrity of the Global Positioning System (GPS). The most common version of DGPS requires high-quality GPS "reference receivers" at known, surveyed locations. The reference station estimates the slowly varying error components of each satellite range measurement and forms a correction for each GPS satellite in view. This correction is broadcast to all DGPS users on a convenient communications link. Typical ranges for a local area differential GPS (LADGPS) station are up to 150 km. Within this operating range, the differential correction greatly improves accuracy for all users, regardless of whether selective availability (SA) is activated or is not. This improvement in the accuracy of the Global Positioning System (GPS) is possible because the largest GPS errors vary slowly with time and are strongly correlated over distance. DGPS also significantly improves the "integrity" of GPS for all classes of users, because it reduces the probability that a GPS user would suffer from an unacceptable position error attributable to an undetected system fault. Expected accuracies with DGPS are within the range from 1 to 5 meters.

Most DGPS systems use a single reference station to develop a scalar correction to the code-phase measurement. If the correction is delivered within 10 seconds, and the user is within 1000 km, the user accuracy should be between 1 and 10 meters.

Network of reference stations can be used to form a vector correction for each satellite. This vector consists of individual corrections for the satellite clock, three components of satellite positioning error (or ephemeris), and parameters of an ionospheric delay model. The validity of this correction still decreases with increased latency or age of the correction. However, compared to a scalar correction, a vector correction is valid over much greater geographical areas. This concept is called wide area DGPS, or WADGPS. Such network can be used for continental or even world-hemisphere coverage, because they require many fewer reference stations than a collection of independent systems with one reference station each, and because they require less communication capacity than the equivalent network of LADGPS systems.

Users with very stringent accuracy requirements may be able to use a technique called carrier-phase DGPS or CDPGS. These users measure the phase of the GPS carrier relative to the carrier phase at a reference site; thus achieving range measurement precision that are a few percent of the carrier wavelength, typically about one centimeter. These GPS phase comparisons are used for vehicle attitude determination and also in survey applications, where the antennas are separated by tens of kilometers. If the antennas are fixed, then the survey is called static, and millimeter accuracies are possible, because long averaging times can be used to combat random noise. If the antennas are moving, then the survey is kinematic, and shorter time constants should be used with some degradation of accuracy.

The given above discussion can be found in "Global Positioning System: Theory and Applications", Volume II, chapter 1, by Bradford W. Parkinson and James J. Spilker Jr., published by the American Institute of Aeronautics and Astronautics, Inc. in 1996.

For CDGPS, the definition of long baseline is arbitrary, but usually refers to baseline lengths exceeding 20 km and up to 100 km. Lines in excess of 100 km may be referred to as very long baselines.

There are two major difficulties with Long Baseline RTK (LBRTK).

(1) Processing in real-time the combined base and rover GPS measurements to yield the baseline vectors with sufficient accuracy—which implies fixed integer multi-frequency solutions; and (2) broadcasting the base (or reference) station GPS data to the roving station (rover), for example using a protocol such as the Trimble CMR data format.

The first problem arises because atmospheric refraction of the satellite signals which has different magnitudes at the two stations makes processing the data over a long baseline with high accuracy very difficult. There are various ways to reduce these effects and increase baseline accuracy. For instance, the errors caused by ionospheric refraction can be reduced by combining satellite signals at two or more distinct frequencies and forming ionospheric-free measurements, while the errors caused by tropospheric refraction can be reduced by using a tropospheric model which van take into account the differences in the height between the two stations. Thus, despite the inherent errors cause by signals refraction, it is possible to compute accurate long baselines.

The second problem is addressed in the copending U.S. patent application entitled "LONG BASELINE RTK USING A SECONDARY BASE RECEIVER AND A NON-CONTINUOUS DATA LINK". This patent application, referred to as the patent application #1, is filed on the same date as the present patent application, assigned to the same assignee, and incorporated in the present application in its entirety. The patent application #1 discloses a system that allows one to perform an RTK survey over a long baseline (LBRTK) using a non-continuous data link.

However, in the patent application #1 the problem of controlling the movement of a rover along a long baseline, including closing the control loop between the rover, a primary base station (PBS), and a secondary base station (SBS) has not been addressed.

What is needed is system of controlling the movement of a rover along a long baseline, including closing the control loop and introducing feedback between the rover, a primary base station (PBS), and a secondary base station (SBS).

SUMMARY

The present invention is unique because it discloses a system and a method for a long baseline remote control.

One aspect of the present invention is directed to a system for long baseline remote control and comprises: (1) a primary base station (PBS); (2) a secondary base station (SBS); (3) a long non-continuous primary data link between the SBS and the PBS; and (4) a secondary two-way data link between the SBS and a rover.

In one embodiment, the PBS is configured to perform a long baseline remote control of a single rover.

In one embodiment, the PBS further comprises: (1) a primary base multi-frequency satellite antenna configured to receive a first plurality of broadcast satellite signals; (2) a primary base satellite receiver configured to continuously obtain a first plurality of satellite observables using the first plurality of received satellite signals; and (3) a primary base data storage configured to log each satellite observable obtained from the first plurality of received satellite signals at a first predetermined interval.

In one embodiment, the SBS further comprises: (1) a secondary base multi-frequency satellite antenna configured to receive a second plurality of broadcast satellite signals; (2) a secondary base satellite receiver configured to continuously obtain a second plurality of satellite observables using the second plurality of received satellite signals; and (3) a secondary base data storage configured to log each satellite observable obtained from the second plurality of received satellite signals at a second predetermined interval.

In the preferred embodiment, the primary non-continuous data link further comprises a primary two-way data link. The primary non-continuous two-way data link can comprise: a cellular telephone link; a radio link; an electronic mail link; or a satellite link.

In the preferred embodiment, the secondary data link further comprises a two-way secondary data link.

The secondary two-way data link can comprise: a radio link; an infrared link; an optical link; a satellite link; a spread spectrum radio link; or a burst communication radio link.

In one embodiment, the spread spectrum radio data link further comprises: an ultra wide band radio link.

In another embodiment, a system for long baseline remote control comprises: a primary base station (PBS); a plurality of secondary base stations (SBS); a plurality of long non-continuous primary data links between the PBS and each SBS; and a plurality of secondary two-way data links connecting each SBS and at least one rover. In this embodiment a single PBS is configured to perform a long baseline remote control of a plurality of rovers via a plurality of SBS.

Another aspect of the present invention is directed to a method for long baseline remote control.

In one embodiment, the method for long baseline remote control further comprises the steps of: (a) transmitting a primary set of remote control data including a primary base positional (PBS_P) data from a primary base station (PBS) to a secondary base station (SBS) using a primary data link; (b) transmitting a secondary set of remote control data including a secondary base positional (SBS_P) data to a rover using a secondary two-way data link between the SBS and the rover; (c) using the rover to collect a set of feedback data; (d) transmitting the set of feedback data to the PBS via the SBS; and (e) repeating the steps (a–d) for a next set of remote control data.

In one embodiment, the step (c) of using the rover to collect the set of feedback data further includes the step of performing a stake-out RTK survey of a database of intended survey marks.

In one embodiment, the rover includes an excavator blade. In this embodiment, the step (b) of transmitting the secondary set of remote control data to the rover further includes the step of: (b1) transmitting a database of three dimensional position coordinates of an intended trajectory of the blade; the step (c) of using the rover to collect the set of feedback data further includes the step of (c1) collecting a database of three dimensional position coordinates of an actual trajectory of the excavator blade; and the step (d) of transmitting the set of feedback data to the PBS further includes the step (d1) of transmitting the database of three dimensional position coordinates of the actual trajectory of the excavator blade.

BRIEF DESCRIPTION OF THE DRAWINGS

FIG. 1 depicts a system for long baseline remote control comprising a primary base station (PBS) and a single secondary base station (SBS).

FIG. 2 illustrates the control data flow of the closed feedback loop between the PBS, the SBS, and the rover.

FIG. 3 depicts the control data flow of the semi-closed feedback loop between the PBS, the SBS, and the rover.

FIG. 4 shows a data set of positional coordinates of a boundary of an intended survey area including a data set of three dimensional position coordinates of intended and actual survey marks.

FIG. 5 depicts an intended image area including a boundary, a data set of three dimensional position coordinates of intended image locations, and images corresponding to each image location.

THE FULL DESCRIPTION OF THE PREFERRED EMBODIMENTS

FIG. 1 depicts a system (100) for long baseline remote control comprising a primary base station (PBS) (102), a single secondary base station (SBS) (122), a long non-continuous primary data link (108) between the SBS and the PBS, and a secondary two-way data link (116) between the SBS and a rover (124).

In one embodiment, the PBS (102) is configured to perform a long baseline remote control of the rover (124).

The PBS (102) further includes a primary base multi-frequency satellite antenna (104) configured to receive a first plurality of broadcast satellite signals from a plurality of satellites (126, 128, 130, 132); a primary base satellite receiver (not shown) configured to continuously obtain a first plurality of satellite observables using the first plurality of received satellite signals; and a primary base data storage (126) configured to log each satellite observable obtained from the first plurality of received satellite signals at a first predetermined interval.

In one embodiment, the SBS (122) includes a secondary base multi-frequency satellite antenna (112) configured to receive a second plurality of broadcast satellite signals from the plurality of satellites (126, 128, 130, 132); a secondary base satellite receiver (not shown) configured to continuously obtain a second plurality of satellite observables using the second plurality of received satellite signals; and a secondary base data storage (124) configured to log each satellite observable obtained from the second plurality of received satellite signals at a second predetermined interval.

In one embodiment, the PBS includes a radio antenna (106 of FIG. 1)) used to communicate with the SBS radio antenna (110 of FIG. 1) ) over the primary two-way radio data link (108 of FIG. 1). (See discussion below).

In one embodiment, the SBS utilizes an additional radio antenna (114 of FIG. 1) to communicate with the rover's antenna (118 of FIG. 1) over the secondary two-way radio data link (116 of FIG. 1). (See discussion below).

The complete description of the functioning of the PBS and the SBS used in the present invention in order to precisely obtain the positional data of the rover (124) along the long baseline is given in the patent application #1 that is incorporated by reference herein.

In the present invention, the secondary data link (116) comprises a two-way data link. The secondary two-way data link can include: a radio link; an infrared link; an optical link; or a satellite link.

In one embodiment, the rover utilizes a clandestine two-way secondary data link. The clandestine two-way secondary data link can include a spread spectrum radio link; or a burst communication radio link. In one embodiment, the spread spectrum radio data link further comprises an ultra wide band radio link. Time Domain Corporation, located in Huntsville, Ala., manufactures different devices designed for channelized ultrawide-band communications.

In the preferred embodiment, the primary non-continuous data link (108) further comprises a primary two-way data link. The primary non-continuous two-way data link can include: a cellular telephone link; a radio link; an electronic mail link; or a satellite link.

In one embodiment, FIG. 2 illustrates the control data flow (140) of the closed feedback loop (142→144→146→148→150→152→142) between the PBS (102 of FIG. 1), the SBS (122 of FIG. 1) and the rover (124 of FIG. 1) that is utilized to remotely control the rover (124).

EXAMPLE I

The rover (124 of FIG. 1) receives the database of intended survey points from the PBS (102 of FIG. 1) via the SBS (122 of FIG. 1), performs the actual "stake-out" survey, creates the database of actually surveyed points that can differ from the database of intended survey points because existing obstacles on the ground may prevent the rover from surveying hidden or unaccessible points, and transmits the set of feedback data including the set of actually surveyed points back to the PBS (102 of FIG. 1) via the SBS (122 of FIG. 1). The next set of data can be sent to the rover from the SBS (122 of FIG. 1) as well as from the PBS (102 of FIG. 1).

In one embodiment, the primary non-continuous data link further comprises a primary one-way non-continuous data link, wherein the PBS is configured to transmit a compressed data set to the SBS using the primary one-way data link according to a predetermined schedule. In this embodiment, FIG. 3 illustrates the control data flow (160) of the semi-closed feedback loop (162→164→166→168→170→164) between the PBS (102 of FIG. 1), the SBS (122 of FIG. 1) and the rover (124 of FIG. 1) that is utilized to remotely control the rover (124).

EXAMPLE II

The rover (124 of FIG. 1) receives the database of intended survey points from the PBS (102 of FIG. 1) via the SBS (122 of FIG. 1), performs the actual "stake-out" survey, creates the database of actually surveyed points that can differ from the database of intended survey points because existing obstacles on the ground may prevent the rover from surveying hidden or unaccessible points, and transmits the set of feedback data including the set of actually surveyed points back only to the SBS (122 of FIG. 1). The next set of data can be sent to the rover from the SBS (122 of FIG. 1) as well as from the PBS (102 of FIG. 1).

In general, the method for long baseline remote control comprises the following steps.

At first, a primary set of remote control data including a primary base positional (PBS_P) data is transmitted from the PBS (102 of FIG. 1) to the SBS (122 of FIG. 1) over a long primary data link (108 of FIG. 1). The primary set of control data can include a first set of satellite logged data stored in the primary data storage (126 of FIG. 1) and a second set of satellite logged data stored in the primary data storage (126 of FIG. 1). The both sets of data can be used by the SBS (122 of FIG. 1) to precisely determine its position coordinates data (SBS_P) according to the method developed in the patent application #1. The primary data set can also include additional remote control data, for instance, the database of the intended, by the PBS, survey marks (PBS-MARKS).

Next, a secondary set of remote control data including the secondary base final positional (SBS_FP) data, the database of the intended, by the PBS, survey marks (PBS-MARKS), and an additional control data is transmitted from the SBS (122 of FIG. 1) to the rover (124 of FIG. 1) using the secondary two-way data link (116 of FIG. 1) between the SBS and the rover.

At the next step, the rover is used to perform the long range RTK (LRRTK) survey of the intended survey marks. However, as was mentioned above, the set of actually survey marks (ROVER-MARKS) can differ from the set of (PBS-MARKS) because some marks can be hidden, or otherwise unaccessible.

Finally, in one embodiment, wherein the primary data link is a two-way data link, the set of (ROVER-MARKS) is transmitted back to the PBS via the SBS; wherein in another embodiment, wherein the primary data link is a one-way data link, the set of (ROVER-MARKS) is transmitted back to the SBS only.

These steps can be repeated for the next set of remote control data, for instance, for the next database of intended survey marks.

In one example, the rover includes an excavator blade. In this embodiment, a database of three dimensional position coordinates of an intended trajectory of the blade is transmitted to the rover. In this embodiment, the rover collects the set of feedback data including a database of three dimensional position coordinates of an actual trajectory of the excavator blade, and transmits this set of data back to the SBS using the secondary two-way data link. In one embodiment, this set of data is transmitted also back to the PBS using the primary two-way data link.

In another example, as depicted in FIG. 4, a data set (182, 184, 186, 188 of FIG. 4) of positional coordinates of a boundary (ABCD of FIG. 4) of an intended survey area (180 of FIG. 4) including a data set of three dimensional position coordinates of intended survey marks (190–218 of FIG. 4) is transmitted from the PBS (102 of FIG. 1) to the rover (124 of FIG. 1). The rover performs the Long Range RTK survey and collects a set of actual survey marks, shown as a set of circled marks (190, 192, 196, 202, 206, 208, 212, 216, and 218 of FIG. 4), during a continuous real time kinematic (RTK) survey operation. In one embodiment, the step of transmitting the control data further includes the step of transmitting the algorithm (S) for creating the set (S/I) of intended survey marks.

In one implementation of the algorithm (S), positional coordinates of the subsequent survey mark is incrementally increased relatively to positional coordinates of the preceding survey mark. In another implementation of the algorithm (S), positional coordinates of each subsequent survey mark is incrementally increased relatively to positional coordinates of the preceding survey mark, and an increment of the increase depends on the rate of altitude change for the intended survey area. In an additional implementation of the algorithm (S), positional coordinates of each subsequent survey mark is incrementally increased relatively to positional coordinates of the preceding survey mark, and an increment of the increase is determined by the operator.

The set (S/A) of actually surveyed marks (190, 192, 196, 202, 206, 208, 212, 216, and 218 of FIG. 4) can be transmitted back to the SBS using the two-way data link (116 of FIG. 1). In one embodiment, the set (S/A) of actually surveyed marks (190, 192, 196, 202, 206, 208, 212, 216, and 218 of FIG. 4) can be transmitted back also to the PBS (102 of FIG. 1) using the two-way data link (108).

In one embodiment, the set (S/A) of actually surveyed marks (190, 192, 196, 202, 206, 208, 212, 216, and 218 of FIG. 4) can be used to build a topographical map of the actual survey area (180 of FIG. 4).

In one embodiment, as depicted in FIG. 5, the PBS (102 of FIG. 1) transmits to the SBS (122) and further to the rover (124 of FIG. 1) over a long baseline (108–116) a data set of positional coordinates of a boundary (F→G→H→E of FIG. 5)) of an intended image area including a data set of three dimensional position coordinates (226–239 of FIG. 5) of intended image locations.

In one embodiment, the rover equipped with an image generator generates a combined set ($\alpha$) of images linked to image locations, wherein each image is linked to one image location. Each element of the set ($\alpha$) of images linked to image locations includes an image and a set of three dimensional coordinates of an image location from which the image was created. In an example depicted in FIG. 5, the set ($\alpha$) of images linked to image locations includes the following elements: {(226, 227); (228, 229); (230, 231); (232, 233); (234, 235); (236, 237); (238, 239)}.

In one embodiment, the step of transmitting the control data further includes the step of transmitting the algorithm ($\alpha$) for creating the set ($\alpha$) of images linked to image locations. In one implementation of the algorithm ($\alpha$), positional coordinates of each subsequent image location is incrementally increased relatively to positional coordinates of each preceding image location. In another implementation of the algorithm ($\alpha$), positional coordinates of each subsequent image location is incrementally increased relatively to positional coordinates of each preceding image location, and an increment of the increase depends on the rate of altitude change for the intended image area. In one additional implementation of the algorithm ($\alpha$), positional coordinates of each subsequent image location is incrementally increased relatively to positional coordinates of the preceding image location, and an increment of the increase is determined by the operator.

An image can include a photograph image, a stereoscopic photograph image; or a videotaped image.

In one embodiment, the rover includes an aircraft equipped with a photo camera and a GPS receiver. In one embodiment, the control data transmitted from the PBS to the rover includes positional coordinates of a boundary of an intended area to be photographed, and each photo is taken from a single airborne photograph location within the boundary according to a predetermined time schedule.

In one embodiment, the combined set ($\alpha$) of images linked to image locations further includes a combined set of photograph airborne images linked to airborne photograph locations.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:
1. A system for long baseline remote control comprising:
a primary base station (PBS); wherein said PBS further comprises:
a primary base multi-frequency satellite antenna configured to receive a first plurality of broadcast satellite signals;
a primary base satellite receiver configured to continuously obtain a first plurality of satellite observables using said first plurality of received satellite signals; and
a primary base data storage configured to log each said satellite observable obtained from said first plurality of received satellite signals at a first predetermined interval;
a secondary base station (SBS);
a long non-continuous primary data link between said SBS and said PBS; and
a secondary two-way data link between said SBS and a rover; wherein said PBS is configured to perform a long baseline remote control of said rover.

2. A system for long baseline remote control comprising:
a primary base station (PBS); wherein said PBS further comprises:
a primary base multi-frequency satellite antenna configured to receive a first plurality of broadcast satellite signals;
a primary base satellite receiver configured to continuously obtain a first plurality of satellite observables using said first plurality of received satellite signals; and
a primary base data storage configured to log each said satellite observable obtained from said first plurality of received satellite signals at a first predetermined interval;
a secondary base station (SBS); wherein said SBS further comprises:
a secondary base multi-frequency satellite antenna configured to receive a second plurality of broadcast satellite signals;
a secondary base satellite receiver configured to continuously obtain a second plurality of satellite observables using said second plurality of received satellite signals; and
a secondary base data storage configured to log each said satellite observable obtained from said second plurality of received satellite signals at a second predetermined interval;
a long non-continuous primary data link between said SBS and said PBS; and
a secondary two-way data link between said SBS and a rover; wherein said PBS is configured to perform a long baseline remote control of said rover.

3. A system for long baseline remote control comprising:
a primary base station (PBS);
a secondary base station (SBS);
a primary one-way non-continuous data link, wherein said PBS is configured to transmit a compressed data set to said SBS using said primary one-way data link according to a predetermined schedule; and
a secondary two-way data link between said SBS and a rover; wherein said PBS is configured to perform a long baseline remote control of said rover.

4. A method for long baseline remote control comprising the steps of:
  (a) transmitting a primary set of remote control data including a primary base positional (PBS_P) data from a primary base station (PBS) to a secondary base station (SBS) using a primary data link;
  (b) transmitting a secondary set of remote control data including a secondary base positional (SBS_P) data to a rover using a secondary two-way data link between said SBS and said rover;
  (c) using said rover to collect a set of feedback data;
  (d) transmitting said set of feedback data to said PBS via said SBS; and
  (e) repeating said steps (a–d) for a next set of remote control data.

5. The method of claim 4, wherein said step (a) of transmitting said primary set of remote control data from said PBS to said SBS further includes the step of:
  generating a positional data set (PBS_P) of said primary base station (PBS).

6. The method of claim 4, wherein said step (b) of transmitting said secondary set of remote control data from said SBS to said rover further includes the step of:
  generating a positional data set (SBS_P) of said secondary base station SBS.

7. The method of claim 4, wherein said step (c) of using said rover to collect said set of feedback data further includes the step of:
  performing a stake-out RTK survey of a database of intended survey marks by using said rover.

8. The method of claim 7, wherein said step (d) of transmitting said set of feedback data to said PBS further includes the step of:
  transmitting a database of actual survey marks to said SBS using said secondary two-way data link.

9. The method of claim 4; wherein said rover includes an excavator blade;
  and wherein said step (b) of transmitting said secondary set of remote control data to said rover using said secondary two-way data link between said SBS and said rover further includes the step of:
  (b1) transmitting a database of three dimensional position coordinates of an intended trajectory of said blade;
  and wherein said step (c) of using said rover to collect said set of feedback data further includes the step of:
  (c1) performing a remote control machine operation.

10. The method of claim 9, wherein said step (c1) of performing said remote control machine operation further includes a step of:
  collecting a database of three dimensional position coordinates of an actual trajectory of said excavator blade.

11. The method of claim 10, wherein said step (d) of transmitting said set of feedback data to said PBS further includes the step of:
  transmitting said database of three dimensional position coordinates of said actual trajectory of said excavator blade.

12. The method of claim 4;
  wherein said step of (b) of transmitting said secondary set of remote control data from said SBS to said rover further includes the step of:
    transmitting a data set of positional coordinates of a boundary of an intended survey area including a data set of three dimensional position coordinates of intended survey marks;
  and wherein said step (c) of using said rover to collect said set of feedback data further includes the step of:
    generating a set of actual survey marks during a continuous real time kinematic (RTK) survey operation;
  and wherein said step (d) of transmitting said set of feedback data to said PBS further includes the steps of:
    transmitting a set of actual survey marks; and
    building a topographical map of an actual survey area.

13. The method of claim 4;
  wherein said step (b) of transmitting said secondary set of remote control data to said rover further includes the steps of:
    (b1) transmitting an algorithm for creating said data set of three dimensional position coordinates of intended survey marks;
    (b2) transmitting a data set of positional coordinates of a boundary of an intended survey area;
  and wherein said step (c) of using said rover to collect said set of feedback data further includes the step of:
    (c1) generating a set of actual survey marks during a continuous real time kinematic (RTK) survey operation;
  and wherein said step (d) of transmitting said set of feedback data to said PBS further includes the steps of:
    (d1) transmitting a set of actual survey marks; and
    (d2) building a topographical map of an actual survey area.

14. The method of claim 13, wherein said step (b1) of transmitting said algorithm for creating said data set of three dimensional position coordinates of intended survey marks further includes the step of:
  transmitting said algorithm for creating said data set of three dimensional position coordinates of intended survey marks, wherein a set of positional coordinates of each said subsequent survey mark is incrementally increased relatively to a set of positional coordinates of one said preceding survey mark.

15. The method of claim 13, wherein said step (b1) of transmitting said algorithm for creating said data set of three dimensional position coordinates of intended survey marks further includes the step of:
  transmitting said algorithm for creating said data set of three dimensional position coordinates of intended survey marks, wherein a set of positional coordinates of each said subsequent survey mark is incrementally increased relatively to a set of positional coordinates of one said preceding survey mark, and wherein an increment of said increase depends on the rate of altitude change for said intended survey area.

16. The method of claim 13, wherein said step (b1) of transmitting said algorithm for creating said data set of three dimensional position coordinates of intended survey marks further includes the step of:
  transmitting said algorithm for creating said data set of three dimensional position coordinates survey marks, wherein a set of positional coordinates of each said subsequent survey mark is incrementally increased relatively to a set of positional coordinates of one said preceding survey mark, and wherein an increment of said increase is determined by the operator.

17. The method of claim 4;
  wherein said step (b) of transmitting said secondary set of remote control data to said rover further includes the step of:
    (b1) transmitting a data set of positional coordinates of a boundary of an intended image area including an algorithm for creating a data set of three dimensional position coordinates of intended image locations;

and wherein said step (c) of using said rover to collect said set of feedback data further includes the step of:

(c1) generating a combined set of images linked to image locations, each said image linked to one said image location, each said element of said set of images linked to image locations includes a set of three dimensional coordinates of one said image location from which one said image is created;

and wherein said step (d) of transmitting said set of feedback data to said PBS further includes the step of:

(d1) transmitting said combined set of images linked to image locations.

18. The method of claim 17, wherein said step (b1) of transmitting said control data further includes the step of:

transmitting said algorithm for creating said data set of images linked to image locations, wherein a set of positional coordinates of each said subsequent image location is incrementally increased relatively to a set of positional coordinates of one said preceding image location.

19. The method of claim 17, wherein said step (b1) of transmitting said control data further includes the step of:

transmitting said algorithm for creating said data set of images linked to image locations, wherein a set of positional coordinates of each said subsequent image location is incrementally increased relatively to a set of positional coordinates of one said preceding image location, and wherein an increment of said increase depends on the rate of altitude change for said intended image area.

20. The method of claim 17, wherein said step (b1) of transmitting said control data further includes the step of:

transmitting said algorithm for creating said data set of images linked to image locations, wherein a set of positional coordinates of each said subsequent image location is incrementally increased relatively to a set of positional coordinates of one said preceding image location, and wherein an increment of said increase is determined by the operator.

21. The method of claim 17;

wherein said step (b1) of transmitting said control data further includes the step of:

transmitting a data set of positional coordinates of a boundary of an intended area to be photographed including a data set of three dimensional position coordinates of photograph locations;

and wherein said step (c1) of generating said combined set of images linked to image locations further includes the step of:

generating a combined set of photograph images linked to photograph locations;

and wherein said step (d1) of transmitting to said PBS said combined set of images linked to image locations further includes the step of:

transmitting said combined set of photograph images linked to photograph locations.

22. The method of claim 17;

wherein said step (b1) of transmitting said control data further includes the step of:

transmitting a data set of positional coordinates of a boundary of an intended area to be stereoscopically photographed including a data set of three dimensional position coordinates of stereoscopic photograph locations;

and wherein said step (c1) of generating said combined set of images linked to image locations further includes the step of:

generating a combined set of stereoscopic photograph images linked to stereoscopic photograph locations;

and wherein said step (d1) of transmitting to said PBS said combined set of images linked to image locations further includes the step of:

transmitting said combined set of stereoscopic photograph images linked to stereoscopic photograph locations.

23. The method of claim 17;

wherein said step (b1) of transmitting said control data further includes the step of:

transmitting a data set of positional coordinates of a boundary of an intended area to be videotaped including a data set of three dimensional position coordinates of videotape locations and including a data set of time periods for videotaping;

and wherein said step (c1) of generating said combined set of images linked to image locations further includes the step of:

generating a combined set of videotaped images linked to videotape marks;

and wherein said step (d1) of transmitting to said PBS said combined set of images linked to image locations further includes the step of:

transmitting said combined set of videotaped images linked to videotape locations.

24. The method of claim 17; wherein said rover includes an aircraft equipped with a photo camera and a GPS receiver;

and wherein said step (b1) of transmitting said control data further includes the step of:

transmitting a data set of positional coordinates of a boundary of an intended area to be photographed, wherein each said photo is taken from a single airborne photograph location within said boundary according to a predetermined time schedule;

and wherein said step (c1) of generating said combined set of images linked to image locations further includes the step of:

generating a combined set of photograph airborne images linked to airborne photograph locations;

and wherein said step (d1) of transmitting to said PBS said combined set of images linked to image locations further includes the step of:

transmitting said combined set of airborne photograph images linked to airborne photograph locations.

* * * * *